(12) United States Patent
Nakao et al.

(10) Patent No.: US 6,683,644 B1
(45) Date of Patent: Jan. 27, 2004

(54) PORTABLE ELECTRONIC APPARATUS WITH FLAT DISPLAY

(75) Inventors: Soichiro Nakao, Asaka (JP); Takayuki Hayashida, Asaka (JP); Mitsuo Soumi, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/314,014

(22) Filed: May 19, 1999

(30) Foreign Application Priority Data

May 20, 1998 (JP) .......................................... 10-138927

(51) Int. Cl.[7] .............................................. H04N 5/225
(52) U.S. Cl. .................. 348/273; 348/333.01; 348/274
(58) Field of Search ............ 348/207.99, 231.9–231.99, 348/333.01–333.12, 371, 372, 373, 374, 375, 376, 370; 386/117, 118, 9; 358/296; 361/728, 752, 753, 760

(56) References Cited

U.S. PATENT DOCUMENTS

| | | | | |
|---|---|---|---|---|
| 4,658,304 A | * | 4/1987 | Tsunekawa et al. ............. 386/9 |
| 5,034,824 A | * | 7/1991 | Morisawa et al. .......... 386/118 |
| 5,606,420 A | * | 2/1997 | Maeda et al. ................ 358/296 |
| 5,875,034 A | * | 2/1999 | Shintani et al. ............. 358/296 |
| 5,903,706 A | * | 5/1999 | Wakabayashi et al. ...... 386/117 |
| 6,181,380 B1 | * | 1/2001 | Toyofuku et al. ........... 348/373 |
| 6,295,088 B1 | * | 9/2001 | Tsukahara et al. ...... 348/333.06 |
| 6,310,648 B1 | * | 10/2001 | Miller et al. ........... 348/333.05 |
| 6,393,222 B1 | * | 5/2002 | Nakagawa et al. ......... 396/287 |
| 6,441,854 B2 | * | 8/2002 | Fellegara et al. ...... 348/333.13 |

FOREIGN PATENT DOCUMENTS

EP 946045 A2 * 9/1999 ............ H04N/1/21

* cited by examiner

Primary Examiner—Tuan Ho
(74) Attorney, Agent, or Firm—Birch, Stewart, Kolasch & Birch, LLP (57) ABSTRACT

When the interior of an electronic camera is seen from the back of the camera, a storage medium chamber is located inside a grip part at the right part of a casing. A smart medium is inserted into and extracted from the storage medium chamber. An LCD is arranged at the left of the storage medium chamber, and the LCD and the storage medium chamber are arranged horizontally on a substrate. A metal shield member encloses the storage medium chamber. The shield member is integrated with a frame member that supports the LCD. The LCD is fixed to the substrate through the frame member. The frame member connects to a ground terminal of the substrate to thereby ground electronic circuits securely.

9 Claims, 6 Drawing Sheets

PORTABLE ELECTRONIC APPARATUS WITH FLAT DISPLAY

BACKGROUND OF THE INVENTION

1. Field of the Invention

The present invention relates generally to a portable electronic apparatus with a flat display, and more particularly to an arrangement of components in a slim electronic apparatus with a flat display such as an electronic camera with an LCD and a portable information terminal.

2. Description of Related Art

An electronic camera in common use has a liquid crystal display (LCD), which is arranged substantially at the center of the back of a casing of the camera, and a storage medium chamber, to which an external storage medium such as a memory card is detachably inserted, arranged at the side (or the bottom) of the casing. Inside the casing, the LCD and the storage medium chamber are overlapping along the depth of the casing. The conventional electronic camera is hence thick.

Moreover, since the LCD is arranged near a grip part, the LCD is often covered with a hand gripping the grip part, and a part of an image displayed on the LCD cannot be seen. These problems are common to portable electronic apparatuses with flat display parts such as personal digital assistants (PDA).

SUMMARY OF THE INVENTION

In view of the foregoing, it is an object of the present invention to provide a portable slim electronic apparatus with a display, which is easy to see.

To achieve the above-mentioned object, the present invention is directed to a portable electronic apparatus comprising: a casing; a flat display for displaying an image; and a storage medium chamber into which an external storage medium is detachably inserted; wherein the flat display and the storage medium chamber are arranged substantially horizontally in the casing without overlapping along the depth of the casing.

According to the present invention, the flat display and the storage medium chamber are arranged horizontally to thereby reduce the thickness of the portable electronic apparatus.

Preferably, the portable electronic apparatus of the present invention further comprises: a substrate on which the storage medium chamber is fixed; a metal shield member enclosing the storage medium chamber; and a frame member supporting the flat display, the frame member being integrated with the metal shield member and being connected to a ground terminal of the substrate; wherein the flat display is fixed on the substrate through the frame member such that the flat display and the storage medium chamber are arranged at the same side of the substrate.

According to the present invention, the flat display can be fixed to the substrate without using fixing means such as screws or braces, and the substrate can be grounded securely.

An embodiment of the portable electronic apparatus of the present invention further comprises: an imaging device for converting a light from a subject into image data; and a storage medium interface for recording the image data obtained by the imaging device into the external storage medium inserted in the storage medium chamber, and for reading data recorded in the external storage medium; wherein the flat display displays at least one of an image represented by the image data obtained by the imaging device and an image represented by the data read from the external storage medium. In this case, the portable electronic apparatus is preferably characterized in that, when the portable electronic apparatus is seen from a back thereof: the casing has a grip part, to be held by an operator, on the right side thereof; the storage medium chamber is arranged inside the grip part in the casing; and the flat display is arranged at the left side of the storage medium chamber.

According to the present invention, the flat display, the storage medium chamber and the capacitor for the electronic flash can be housed compactly in the casing. This reduces the size and the thickness of the portable electronic apparatus. When seen from a viewpoint of the operator who is holding the grip part with the right hand, the flat display is located at the left part of the back of the casing. Thus, there is little possibility that the flat display will be covered with the right hand, and the image displayed on the flat display is easy to see.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
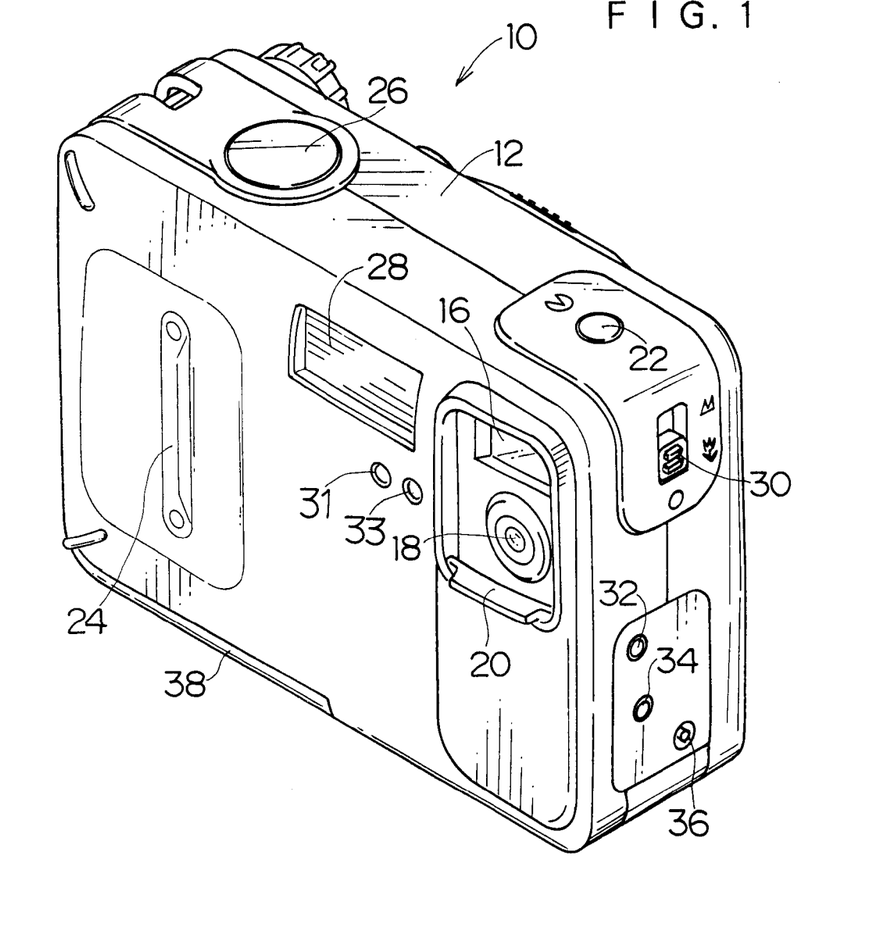
FIG. 1 is a perspective view showing an electronic camera according to an embodiment of the present invention.

FIG. 1 shows an electronic camera 10 according to an embodiment of the present invention. As shown in FIG. 1, the electronic camera 10 has a substantially rectangular-parallelepiped casing 12. A finder window 16 and a taking lens 18 are arranged vertically at the right side of the front of the casing 12. Various types of finders and lenses may be used; for example, an Albada finder and a short focus lens with a focal length of about 4 mm. An imaging device or a charge-coupled device (CCD) is arranged behind the taking lens 18. The number of pixels in the CCD should be determined according to a desired image quality. The number of pixels is preferably three hundred and fifty thousand or more. The imaging device is not necessarily the CCD, but it may also be other kinds of imaging devices such as a metal oxide semiconductor (MOS) type imaging device and a charge injection device (CID), or an imaging tube.

A lens cover 20, which is vertically slidable, is provided at the front of the finder window 16 and the taking lens 18.

Pressing a cover opening button 22 at the top of the casing 12 unlatches the lens cover 20 from a stopper mechanism (not shown), and a forcing means such as a spring slides the lens cover 20 downward. Consequently, the finder window 16 and the taking lens 18 are opened to become capable of capturing an image. When the camera 10 is not used, the lens cover 20 is slid up to cover the finder window 16 and the taking lens 18. When completely closed, the lens cover 20 is held by the stopper mechanism to thereby protect the finder window 16 and the taking lens 18.

A grip part 24 is formed at the left part of the casing 12 in FIG. 1 so that the operator can easily hold the camera 10 with the right hand. A release button 26 is arranged at the top of the casing 12. The release button 26 is pressed in two steps. When the release button 26 is pressed half, an automatic focusing (AF) and an automatic exposure control (AE) operate to lock the AF and the AE. When the release button 26 is pressed completely, an image-recording start signal is transmitted to start recording the image.

An electronic flash 28 is provided at the central upper part of the front of the casing 12, and an electronic flash control sensor 31 and a self-timer lamp 33 are arranged horizontally below the electronic flash 28. Since the electronic flash 28 is arranged closer to the central part than the grip part 24 as shown in FIG. 1, the operator's hand holding the grip part 24 does not touch or cover the electronic flash 28.

An object distance setting switch 30 is provided at the right side of the casing 12. Vertically sliding the switch 30 selects suitable setting of an optical system for a close-up or a long shot. A digital input/output terminal 32, a video output terminal 34 and a power supply terminal 36 are provided at the right side of the casing 12.

Figure 2:
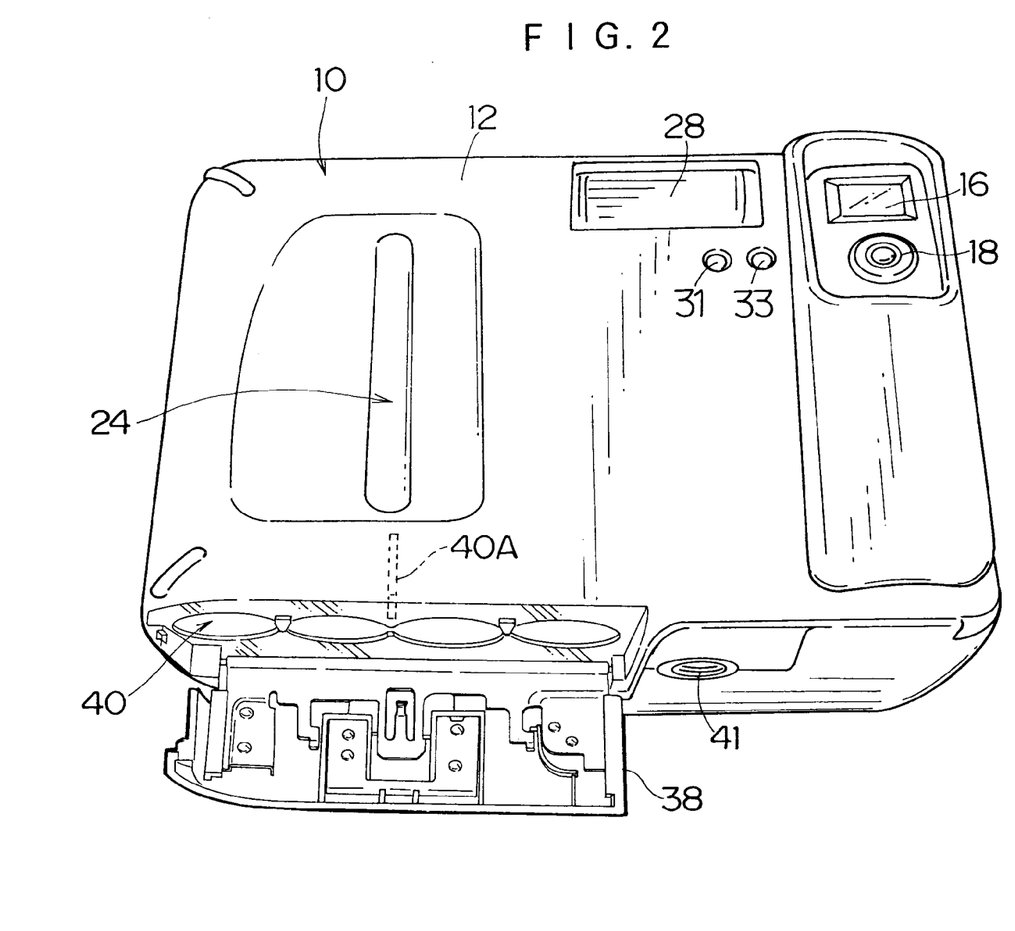
FIG. 2 is a perspective bottom view showing the electronic camera in FIG. 1.

A battery cover 38 is openably attached at the bottom of the casing 12 with a hinge mechanism (not shown). Sliding the battery cover 38 to the front in FIG. 1 unlatches the battery cover 38 from a stopper mechanism (not shown), which usually holds the battery cover 38 close, and opens the battery cover 38 downward. As shown in FIG. 2, a battery chamber 40 contains four batteries (e.g., size AA batteries) (not shown) which are substantially columnar. The four batteries are arranged in such a manner that the longitudinal direction thereof is the vertical direction of the casing 12. After the four batteries are inserted into the battery chamber 40 from below the casing 12, the battery cover 38 is closed in a procedure reverse to the cover opening procedure. Consequently, the stopper mechanism holds the battery cover 38 close, and the loading of the batteries is completed. Reference numeral 40A in FIG. 2 is a support in the battery chamber 40, and 41 is a screw hole for fixing a tripod.

Figure 3:
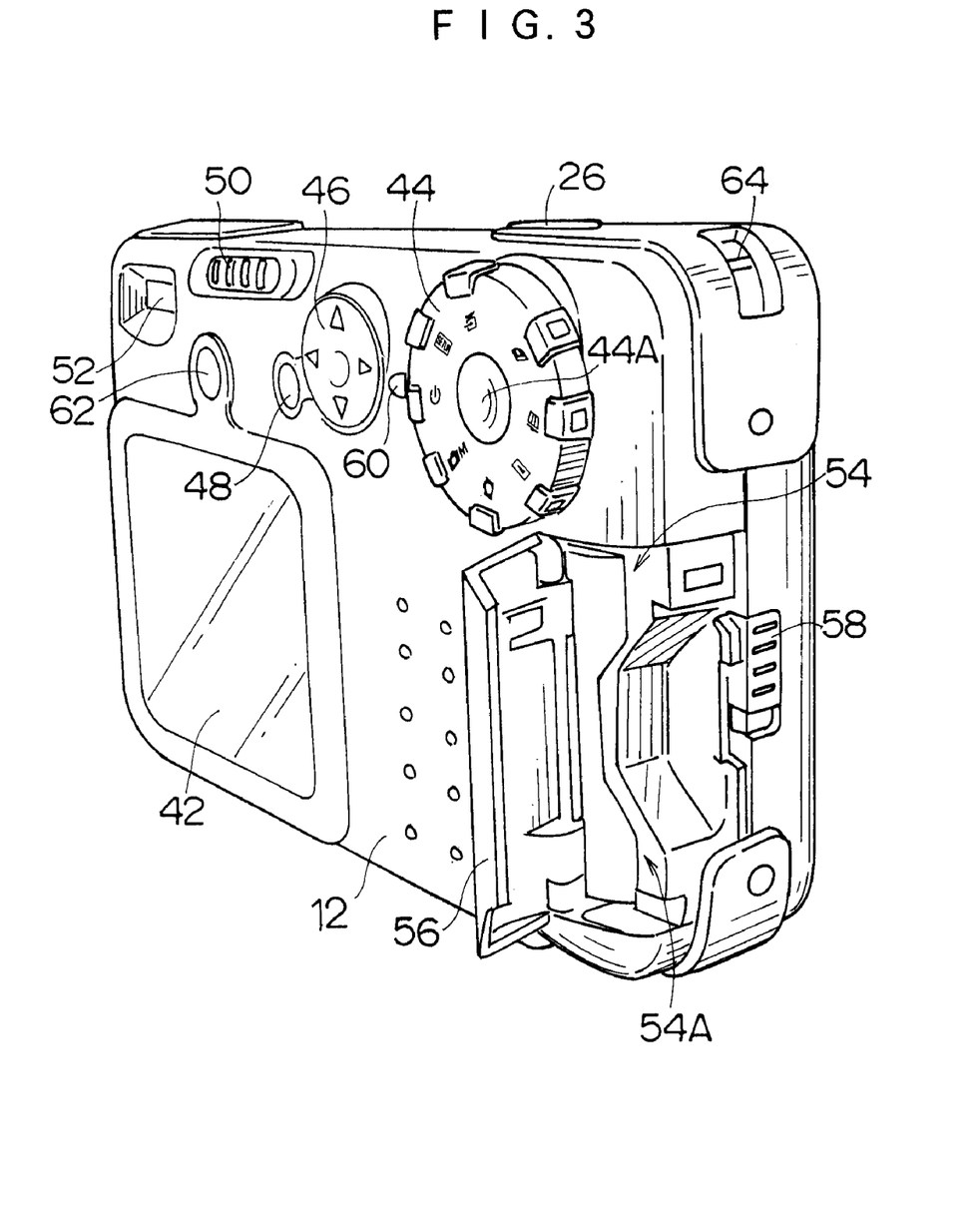
FIG. 3 is a perspective back view showing the electronic camera in FIG. 1.

FIG. 3 is a perspective back view of the electronic camera 10 in FIG. 1. A flat display or an LCD 42, a mode dial 44, a cross key (an upper/lower key and a right/left key) 46, a menu/execution key 48, a power switch 50, a finder eyepiece 52 are arranged at the back of the casing 12.

An inlet 54A of a storage medium chamber 54 is arranged at the right side of the casing 12 in FIG. 3 (at the same side at which the grip part 24 is provided). An external storage medium or a memory card (e.g., a smart medium) is inserted into and extracted from the storage medium chamber 54 through the inlet 54A. In this electronic camera 10, the smart medium (an image memory card) is used as the external storage medium for recording the image data, but it is also possible to use various types of storage mediums such as a PC card, a flash memory card, an IC card, a floppy disk, a magneto-optical (MO) disk, an optical disk, and a memory stick.

On the casing 12, the inlet 54A is arranged in such a way that the longitudinal direction thereof is vertical. Hence, the smart medium can be inserted and extracted along a plane perpendicular to an optical axis of the taking lens 18. A lid 56 for covering the inlet 54A is openably attached at the casing 12 with a hinge mechanism. Sliding a cover opening slider 58 down in FIG. 3 unlatches the lid 56 from a stopper means (not shown) to open the lid 56. When the lid 56 is closed, the stopper means holds the lid 56 close.

The LCD 42 displays images captured through the imaging system, which comprises the taking lens 18 and the CCD, and images (including characters) represented with data read from the smart medium inserted to the storage medium chamber 54. For example, a 2-inch low temperature polysilicon LCD is used as the LCD 42. The LCD 42 is arranged at the left of the storage medium chamber 54 on the back of the casing 12. The LCD 42 and the storage medium chamber 54 are arranged horizontally on a substrate 66 (see FIG. 4) without overlapping along the depth of the casing 12. Thus, the LCD 42 is arranged at the lower left corner of the casing 12, so that the LCD 42 is away from the grip part 24 as shown in FIG. 3.

The mode dial 44 is provided at the upper right corner of the back of the casing 12 in FIG. 3, that is, at the position where the thumb of the right hand holding the grip part 24 is naturally positioned. The functions (modes) of the camera 10 are changed according to the set positions of the mode dial 44. For example, eight marks or characters representing the following modes are put sequentially along the circumference of the mode dial 44: "setup", "self-timer", "manual image-recording", "automatic image-recording", "reproduction", "erasure","protection", and "connection to a personal computer (PC)."

To select a mode, the mode dial 44 is rotated clockwise or counterclockwise in FIG. 3 to set the mark or the character representing a desired mode to an index 60. A small concave part 44A is formed at the center of the mode dial 44. The thumb is placed on the concave 44A while the mode dial 44 is not operated. The mode dial 44 thus serves as a thumb rest, and this eliminates the necessity of providing a special space for placing the thumb. In addition, the thumb can be placed on the concave part 44A in a stable condition, and the operator can securely hold the camera 10.

The cross key 46 is arranged at the left of the mode dial 44. The cross key 46 is tiltable in four perpendicular directions, and it is shaped like a dish with a concave center. Four triangular marks are put on a inclined surface, which is formed from the peripheral part to the center of the cross key 46, to indicate upward, downward, right and left directions.

Pressing one of the triangular marks tilts the cross key 46, and the designation of the corresponding direction can be entered. The cross key 46 is used as an operation key to select a variety of setting items, change the settings, adjust the magnification of the electronic zooming, move the zooming center, and forward and reverse the reproduced frames.

The menu/execution key 48 is arranged at the lower left of the cross key 46. The menu/execution key 48 is used to confirm the setting item selected or changed by the cross key 46 and to display a menu showing a list of setting items on the LCD 42.

A display key 62 is provided at the center of the upper side of the LCD 42. The LCD 42 is turned on and off alternately by pressing the display key 62. When the display key 62 is pressed to turn on the LCD 42 in the image-recording mode, an image (a moving picture) captured through the imaging system is displayed on the screen. Then, the operator looks at the screen while determining a picture composition.

At the back of the casing 12, all the control parts such as the mode dial 44, the cross key 46 and the menu/execution key 48 are arranged within reach of the thumb of the right hand, which is holding the grip part 24, so that the operator can operate the control parts with one hand. In particular, the mode dial 44, the cross key 46 and the menu/execution key 48 are arranged so that the operator can enter desired commands by efficiently moving the thumb from the right to the left in the sequence of operations. In FIG. 3, a strap attachment part 64 is provided at the top of the right side of the casing 12.

Figure 4:
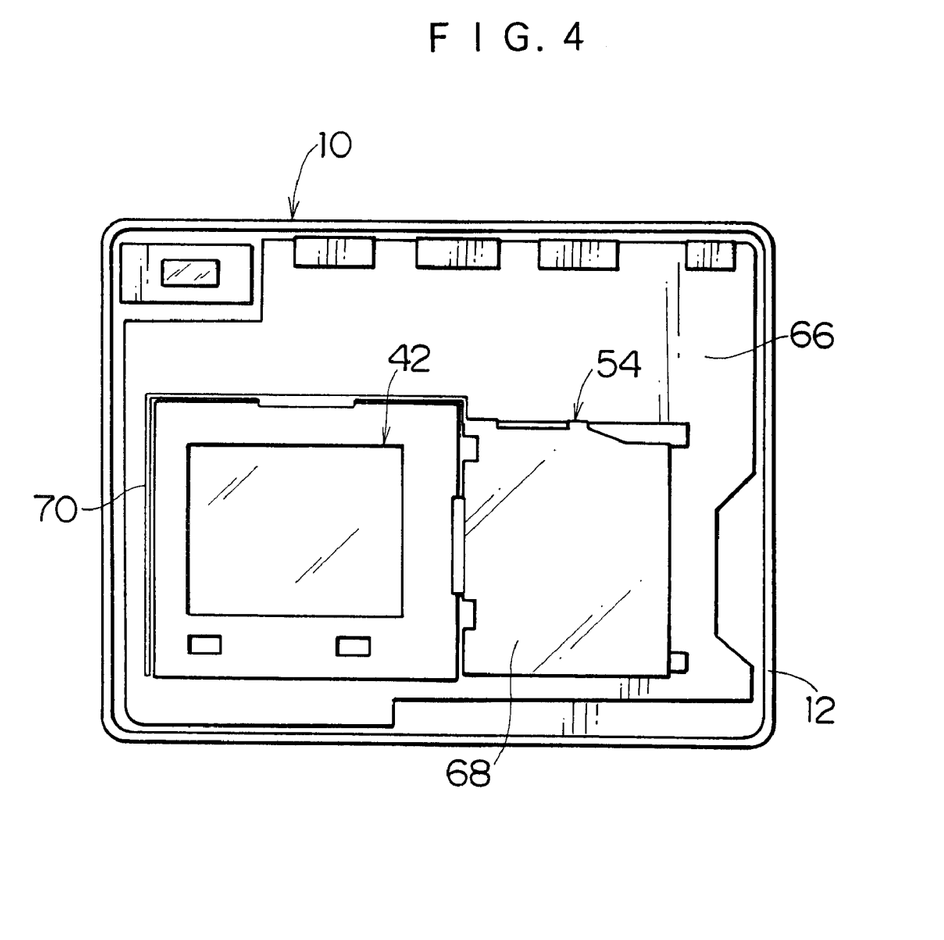
FIG. 4 is a plan view showing the interior structure of the electronic camera in FIG. 1.

FIG. 4 is a back view showing the interior of the electronic camera 10. As shown in FIG. 4, the storage medium chamber 54 is arranged inside the grip part 24 at the right of the casing 12, and the LCD 42 is arranged at the left of the storage medium chamber 54. The storage medium chamber 54 is a well-known standoff type, and it is attached on the substrate 66.

Figure 5:
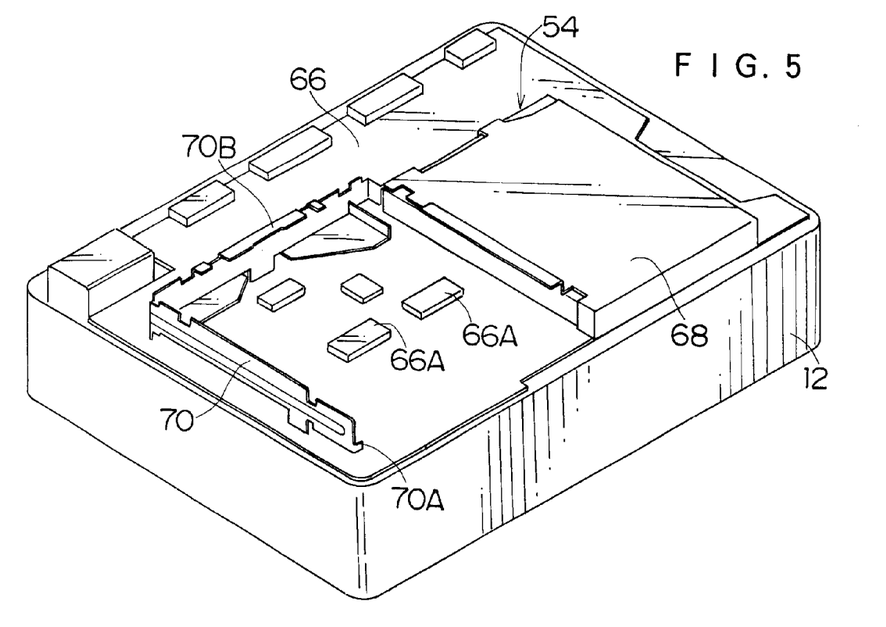
FIG. 5 is a perspective view showing the interior structure of the electronic camera in FIG. 1.

The surface of the storage medium chamber 54 is covered with a metallic shield member 68 to reduce noises. An image signal processing circuit, a central processing unit (CPU), a drive circuit for the LCD 42, and so on are formed on the substrate 66. As shown in FIG. 5, a metal plate serving as the shield member 68 is integrated with a frame member 70, which holds the peripheral sides of the LCD 42 (omitted from FIG. 5). The frame member 70 is bent to enclose the right and left sides and the upper side of the LCD 42. Some hooks 70A, 70B for holding the LCD 42 are formed on the frame member 70.

The LCD 42 connects to terminals 66A on the substrate 66 through a flexible cable (not shown). The LCD 42 is inserted into the frame member 70 and fixed with a back part (omitted from FIG. 5) of the casing 12. The shield member 68 connects to a ground terminal on the substrate 66, and the frame member 70 connects to a ground terminal at the left end of the substrate 66 in FIG. 5. Consequently, the electronic circuits on the substrate 66 can be grounded securely.

Figure 6:
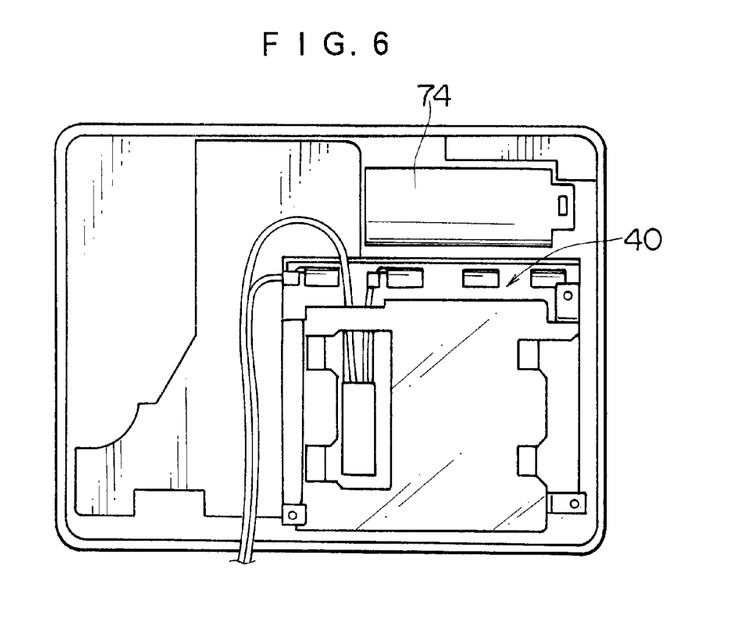
FIG. 6 is a view showing the interior structure of the electronic camera in FIG. 1, from which a substrate in FIG. 4 is detached.

FIG. 6 shows the interior structure of the camera 10, from which the substrate 66 in FIG. 5 is detached. An electric flash capacitor 74, which is substantially columnar, is arranged above the battery chamber 40 and before the substrate 66 (i.e., between a front part of the casing 12 and the substrate 66) such that the longitudinal direction of the electric flash capacitor 74 is parallel with the widthwise direction of the casing 12. The electric flash capacitor 74 accumulates electric charges to be supplied to the electronic flash 28. The arrangement of the electric flash capacitor 74 is not restricted to this. The electric flash capacitor 74 may be arranged above the LCD 42 and the storage medium chamber 54 and behind the substrate 66 (i.e., between the back part of the casing 12 and the substrate 66).

A description will be given of the operation of the electronic camera 10, which is constructed in the above-mentioned manner.

In the electronic camera 10 of this embodiment described with reference to FIGS. 4 and 5, the LCD 42 and the storage medium chamber 54 are arranged horizontally on the substrate 66 to reduce the thickness of the camera 10. The arrangement of the batteries as shown in FIG. 2 further reduces the thickness of the camera 10.

Since the frame member 70, which is integrated with the shield member 68 of the storage medium chamber 54, supports the LCD 42, there is no necessity of providing screws or braces for fixing the LCD 42. It is hence easy to assemble the camera 10. Moreover, the frame member 70 connects to the ground terminal on the substrate 66. Thus, the electronic circuits on the substrate 66 can be grounded securely, and the circuits can operate in a stable condition.

When the operator, who holds the grip part 24 of the casing 12 with the right hand, slides the power switch 50 to the right in FIG. 3, an opening screen is displayed on the LCD 42. When the operator releases the power switch 50, a forcing means (not shown) returns the power switch 50 to its original position.

Then, the operator rotates the mode dial 44 to set a desired mode. When the mode dial 44 is set to "SETUP," a setup screen is displayed on the LCD 42. The operator operates the upper/lower keys of the cross key 46 to select an item to be changed on the setup screen. The operator changes the settings by operating the right/left keys of the cross key 46 to enter a desired setting. Every time the right/left keys of the cross key 46 are pressed, the settings are changed. After a desired setting is displayed, the right/left keys of the cross key 46 are no longer pressed. To fix the setting, the operator presses the menu/execution key 48 or switches the mode dial 44 to another mode.

To record the image normally, the mode dial 44 is set to the automatic image-recording mode. In the automatic image-recording mode, the camera 10 automatically controls the exposure (a combination of an electronic shutter value and an aperture value) and the focus, and the image data read from the CCD is automatically recorded in the smart medium inserted in the storage medium chamber 54 in response to the full press of the release button 26.

The operator looks an object through the finder eyepiece 52 to determine the picture composition by matching an AF frame mark, which appears substantially at the center of a finder visual field, with the object, and half-presses the release button 26 to activate the AE and AF functions. When the operator completely presses the release button 26, the image is recorded, that is, the image data read from the CCD is recorded in the smart medium inserted in the storage medium chamber 54 through a predetermined signal processing.

If the display key 62 is pressed after the mode dial 44 is set to the automatic image-recording mode, an image read from the CCD before the recording is displayed on the LCD 42. The operator can look at the LCD 42 while determining the picture composition. Then, the operator operates the release button 26 to record the image in the above-described procedure.

In the reproduction mode, the recorded image in the smart medium inserted in the storage medium chamber 54 is reproduced on the LCD 42 or output to the outside equipment such as a personal computer. For example, the images are reproduced on a frame-by-frame basis; multiple images are reproduced at once; or the images are reproduced sequentially at regular intervals from a designated frame (automatic play). It is also possible to enlarge the reproduced image in electronic zooming, copy the image data to another medium, change the tone of the recorded image and change the number of pixels (resizing). A desired command is entered by operating the cross key 46 and the menu/execution key 48.

When the mode dial 44 is set to the reproduction mode, the image in the last frame recorded in the smart medium inserted in the storage medium chamber 54 is reproduced and is displayed on the LCD 42, etc. To reproduce an image in another frame, the right/left keys of the cross key 46 are operated to turn the frames. If the right key is pressed, the reproduced frame is forwarded by one frame. If the left key is pressed, the reproduced frame is reversed by one frame.

Figure 7:
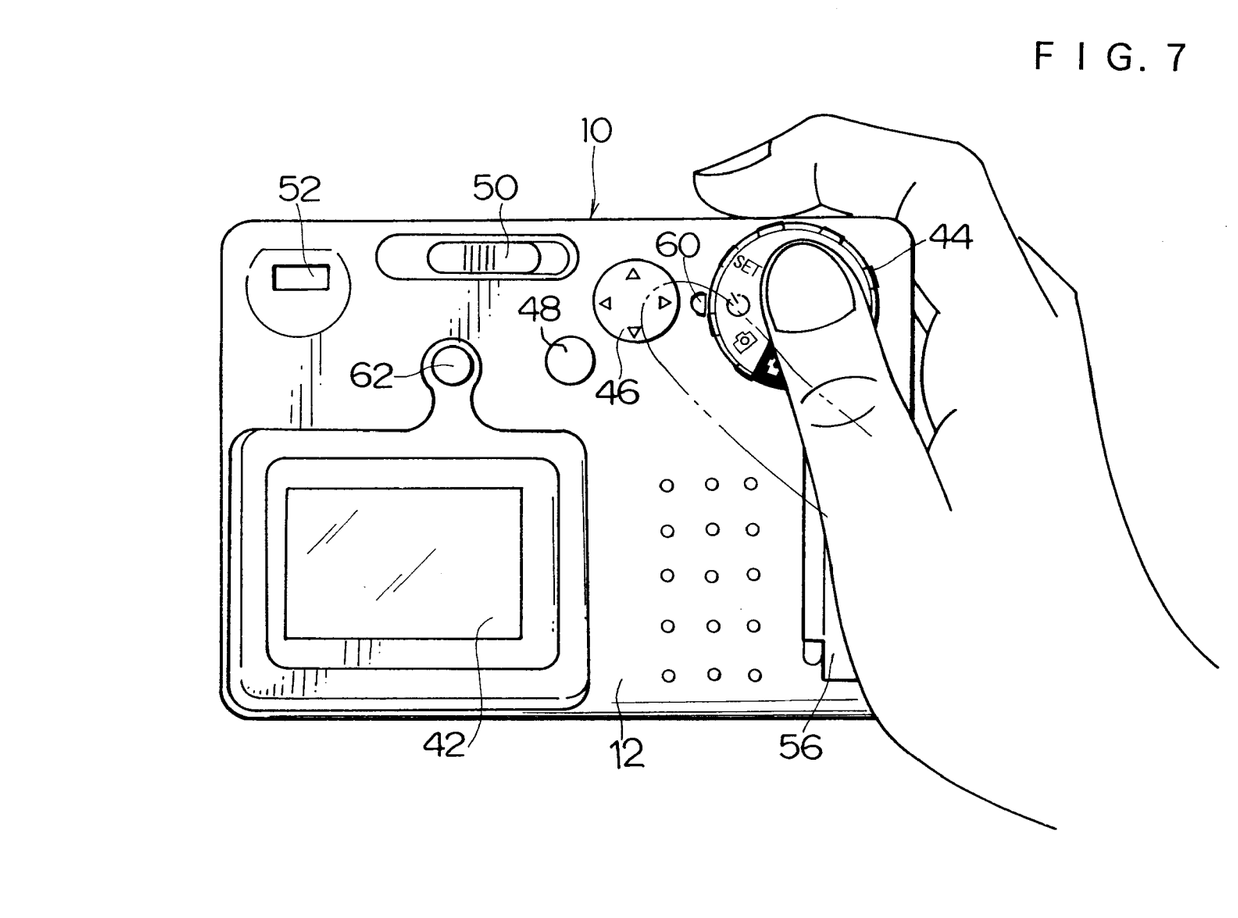
FIG. 7 is a back view showing the state wherein the electronic camera is held by a hand.

According to the electronic camera 10 of this embodiment, it is possible to easily operate the control parts such as the mode dial 44, the cross key 46, the power switch 50, the display key 62 and the menu/execution key 48 with only the thumb of the right hand, which is holding the grip part 24. In particular, the operator can securely change the display on the LCD 42 by operating the control parts (the mode dial 44 and the cross key 46) while looking at the display on the LCD 42 without covering the LCD 42 by the hand.

In this embodiment, the LCD is used as the flat display, but the display is not restricted to the LCD. For example, an electroluminescence (EL) display, a light emitting diode (LED) display, a plasma display, or the like may also be used.

In this embodiment, the present invention is applied to the electronic camera, but the present invention may also be applied to any kinds of portable electronic apparatus that has a flat display, such as an electronic book and a portable information terminal.

As set forth hereinabove, in the portable electronic apparatus according to the present invention, the flat display and the storage medium chamber are arranged horizontally without overlapping along the depth of the casing, thereby reducing the size of the casing. Moreover, the flat display is supported on the substrate through the frame member, which is integrated with the shield member of the storage medium chamber. It is therefore possible to fix the flat display without using fixing means such as screws or braces and to ground the electronic circuits on the substrate securely.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A portable electronic apparatus comprising:
    a casing;
    a flat display for displaying an image; and
    a storage medium chamber into which an external storage medium is detachably inserted;
    wherein the flat display and the storage medium chamber are arranged substantially horizontally in the casing without overlapping along the depth of the casing,
    wherein the flat display and the storage medium chamber are arranged horizontally on a common substrate that is arranged in the casing.

2. The portable electronic apparatus as defined in claim 1, further comprising:
    an imaging device for converting a light from a subject into image data; and
    a storage medium interface for recording the image data obtained by the imaging device into the external storage medium inserted in the storage medium chamber, and for reading data recorded in the external storage medium;
    wherein the flat display displays at least one of an image represented by the image data obtained by the imaging device and an image represented by the data read from the external storage medium.

3. The portable electronic apparatus as defined in claim 2, wherein, when the portable electronic apparatus is seen from a back thereof:
    the casing has a protruding grip part on the front thereof, to be held by an operator, on the right side thereof;
    the storage medium chamber is arranged inside the grip part in the casing; and
    the flat display is arranged at the left side of the storage medium chamber.

4. The portable electronic device as defined in claim 3, further comprising:
    an electronic flash for illuminating the subject;
    a capacitor for accumulating electric charges to be supplied to the electronic flash, the capacitor being arranged above the storage medium chamber and the flat display in the casing such that the longitudinal direction of the capacitor is parallel with the widthwise direction of the casing.

5. The portable electronic apparatus as defined in claim 1, further comprising:
    a metal shield member enclosing the storage medium chamber; and
    a frame member supporting the flat display, the frame member being integrated with the metal shield member and being connected to a ground terminal of the substrate;
    wherein the flat display is fixed on the substrate through the frame member such that the flat display and the storage medium chamber are arranged at the same side of the substrate.

6. The portable electronic apparatus as defined in claim 5, further comprising:
    an imaging device for converting a light from a subject into image data; and
    a storage medium interface for recording the image data obtained by the imaging device into the external storage medium inserted in the storage medium chamber, and for reading data recorded in the external storage medium;
    wherein the flat display displays at least one of an image represented by the image data obtained by the imaging device and an image represented by the data read from the external storage medium.

7. The portable electronic apparatus as defined in claim 6, wherein, when the portable electronic apparatus is seen from a back thereof:
    the casing has a grip part, to be held by an operator, on the right side thereof;
    the storage medium chamber is arranged inside the grip part in the casing; and
    the flat display is arranged at the left side of the storage medium chamber.

8. The portable electronic device as defined in claim 7, further comprising:
    an electronic flash for illuminating the subject;
    a capacitor for accumulating electric charges to be supplied to the electronic flash, the capacitor being arranged above the storage medium chamber and the flat display in the casing such that the longitudinal direction of the capacitor is parallel with the widthwise direction of the casing.

9. A portable slim electronic apparatus comprising:
    a casing having a protruding right hand grip on the front thereof;
    a flat display for displaying an image; and
    a storage medium chamber into which an external storage medium is detachably inserted, the storage medium chamber having an openly attached cover;
    wherein the flat display and the storage medium chamber cover are arranged on the back of the casing in a substantially horizontally fashion without overlapping along the depth of the casing,
    wherein the flat display and the storage medium chamber are arranged horizontally on a common substrate that is arranged in the casing.

* * * * *